J. F. & E. P. Monroe.
Apple-Parer.
N° 75951        Patented Mar. 24, 1868
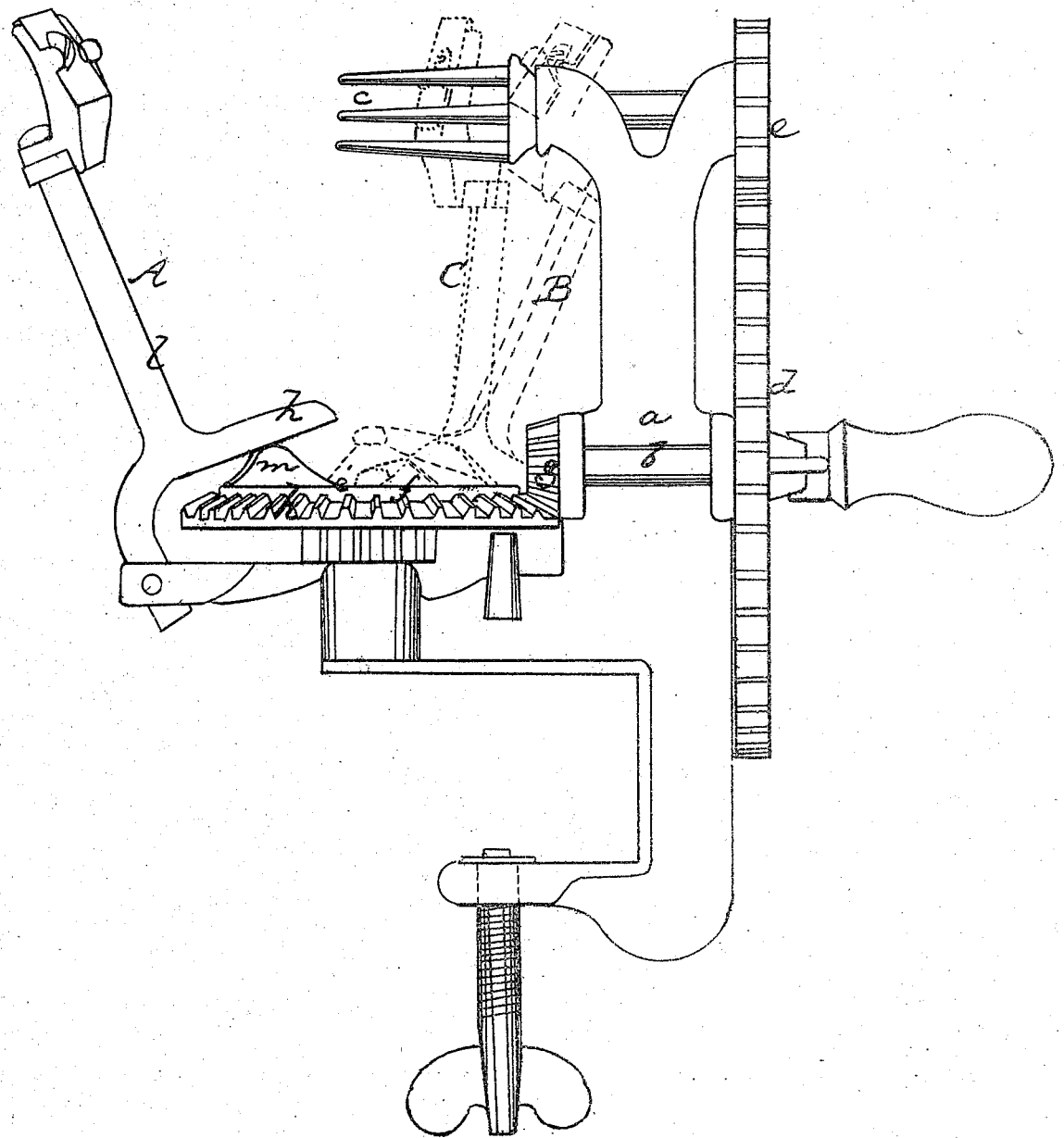
J. F. & E. P. Monroe
by their Attys.
Crosby Halsted & Gould
Witnesses
S. B. Kidder
N. W. Frothingham

United States Patent Office.

JAMES F. MONROE AND EDWIN P. MONROE, OF FITCHBURG, MASSACHUSETTS.

Letters Patent No. 75,951, dated March 24, 1868.

IMPROVED APPLE-PARER.

*The Schedule referred to in these Letters Patent and making part of the same.*

TO ALL WHOM IT MAY CONCERN:

Be it known that we, JAMES F. MONROE and EDWIN P. MONROE, of Fitchburg, in the county of Worcester, and State of Massachusetts, have invented an Improvement in Apple-Parers; and we do hereby declare that the following, taken in connection with the drawings which accompany and form part of this specification, is a description of our invention sufficient to enable those skilled in the art to practise it.

In that class of apple-parers described in United States Patent, No. 15,683, of 1856, in which the knife is carried around from end to end of the rotating apple by means of a segment-gear or toothed sector on a horizontal wheel, meshing into a pinion or gear connected with the knife or cutter-arm, (the cutter being carried back to normal position, after paring the apple, by a spring, or other suitable means,) some provision is desirable to carry the paring-knife out of contact with the surface of the apple, after the paring is effected, and to keep it thus away during the return of the cutter to its normal position, the cutter being in such position in the line of the fork, at the completion of its outward movement, that the apple cannot then be readily removed from the fork, and its return movement carrying the knife back with its edge still in contact with the surface of the fruit. Our invention has reference to such a provision; and the invention consists in combining, with the wheel which directly effects the rotary or semi-rotary movement of the cutter, an incline, which, as the cutter completes its outward movement, slides under a finger projecting from the cutter-arm, and throws up such finger, and thereby swings the cutter out from the apple, this finger riding back on top of the incline, while, in the continued rotation of the wheel, the cutter-arm moves back to its normal position, and slipping down therefrom at the completion of the back movement of the cutter-arm.

The drawing represents an apple-parer embodying our invention, the cutter being shown by the full lines in the position into which it is thrown when the apple is pared, and by the dotted lines in the position it occupies at the end of its rear movement, but just before it slips into normal position, while the red lines show its position just before thrown out from the surface of the apple, and when commencing to pare.

$a$ denotes the frame in which the operative parts of the mechanism are mounted, the driving-shaft $b$ effecting the rotation of the fork $c$ through gears $d$ $e$, and the rotation of the wheel $f$ through gears $g$ $h$, and the wheel $f$ effecting the semi-revolving movement of the paring-knife around the apple, in the same or substantially the same manner as is shown in said patent. On the upper surface of the wheel $f$ is a ring, $i$, upon which rests a finger, $k$, projecting from the cutter arm $l$. Projecting up from this ring is an incline or cam, $m$. As the forward end of this incline slides under the finger $k$, it forces up said finger, and thereby carries back the cutter, as seen at A, or in such manner as to carry the cutter entirely away from the apple, this taking place at the completion of the outward movement of the cutter, or as the paring of the apple is effected. As the cutter-arm then swings round to the base of the fork, the incline or cam and the finger move together, the finger resting upon top of the incline, and thereby keeping the cutter away from the apple (or in position seen at A and B) during its return movement, the finger then sliding down the incline, and permitting the cutter to spring back to normal position, or in position for the fork to receive a fresh apple, and for the knife to begin to pare the same, this position being shown at C by the red lines.

This outward movement of the cutter not only carries it away from the surface of the apple which has been pared, and thereby prevents any further action of the cutter upon the fruit, but also permits the pared fruit to be more readily removed.

We claim, in combination with the rotary wheel $f$, and with the cutter-arm actuated to effect the forward movement of the paring-knife, (substantially as set forth,) the incline or cam $m$ and finger $k$, arranged to operate substantially as described.

JAMES F. MONROE,
EDWIN P. MONROE.

Witnesses:
WILLIAM F. HARRIS,
SAM'L MILLER.